United States Patent [19]
Fuchikami et al.

[11] Patent Number: 4,554,263
[45] Date of Patent: Nov. 19, 1985

[54] CATALYSTS FOR HYDROTREATING HEAVY OILS

[75] Inventors: Jun Fuchikami, Koga; Takemithu Yano, Kitakyushu, both of Japan

[73] Assignee: Catalysts & Chemicals Industries Co., Ltd., Tokyo, Japan

[21] Appl. No.: 606,795

[22] Filed: May 3, 1984

[30] Foreign Application Priority Data

May 10, 1983 [JP] Japan .................. 58-81568

[51] Int. Cl.$^4$ .................. B01J 29/14; B01J 29/16
[52] U.S. Cl. .................. 502/66; 502/74; 502/79
[58] Field of Search .................. 502/66, 76, 79

[56] References Cited

U.S. PATENT DOCUMENTS

| 3,557,024 | 1/1971 | Young et al. | 502/66 |
| 3,598,719 | 8/1971 | White | 502/66 X |
| 3,897,327 | 7/1975 | Ward | 502/66 X |
| 4,277,373 | 7/1981 | Sawyer et al. | 502/66 |
| 4,459,367 | 7/1984 | O'Hara | 502/66 |

*Primary Examiner*—Carl F. Dees
*Attorney, Agent, or Firm*—Flynn, Thiel, Boutell & Tanis

[57] ABSTRACT

A catalyst, prepared by supporting a catalytic effective amount of hydrogenation metal on a catalyst carrier material comprising zeolite and an amorphous inorganic oxide and further incorporating 1–15 wt % of sulfate anions therein, is effective as a hydrotreating catalyst for producing an intermediate fraction with a high yield by desulfurization, demetallization and dentrification of heavy oils.

9 Claims, No Drawings

CATALYSTS FOR HYDROTREATING HEAVY OILS

BACKGROUND OF THE INVENTION

The present invention relates to catalysts for hydrotreating heavy oils including, as typical examples, topped crude and vacuum residue, in more detail relates to catalysts which are capable of achieving satisfactory results in the process of desulfurization, demetallization or denitrification and further in the point of yield of kerosene-gas oil fractions when used in hydrotreating heavy oils.

In recent years, as crude oils are becoming heavier and heavier, the techniques are becoming more and more important which comprise treating heavy oils containing high molecular weight such as asphaltenes, resins and further containing vanadium, nickel and the like in the form of organic metallic compounds, in the presence of catalysts and under hydrogen pressure and effecting desulfurization, demetallization or denitrification while cracking said heavy oils. On the other hand, with increase of the demand for kerosene-gas oil, there is a more increasing demand for obtaining kerosene-gas oil fractions, which are called the middle cut, in high yield in desulfurization, demetallization or denitrification processes of heavy oils while suppressing the by-production of gas components as much as possible when hydrotreating heavy oils. However, the fact is that it is extremely difficult for the usual hydrotreating catalysts to effect desulfurization, demetallization or denitrification of heavy oils to the fullest extent and further obtain kerosene and gas oil fractions in high yield.

That is to say, in hydrotreating heavy oils there have been normally used catalysts prepared by impregnating hydrogenation metals on the carriers comprising amorphous inorganic oxides and zeolite. The carriers of such catalysts are roughly divided into those consisting mainly of amorphous inorganic oxides and those consisting mainly of zeolite. The former displays high efficiencies in desulfurization, demetallization and denitrification (which will be called desulfurization and the like hereinafter) but it is difficult to obtain kerosene-gas oil fraction in high yield, while the latter, in contrast to the former, ensures a high yield of kerosene-gas oil fraction but does not always have enough activity for effecting desulfurization and the like. When the ratio of the amount of amorphous inorganic oxide to that of zeolite has been controlled properly, it results in that the activity of desulfurization and the like and the yield of kerosene and gas oil are both set at some low value.

To sum up, it is usual that in the conventional hydrotreating catalysts, since the improvement in activity of desulfurization and the like and the increase in yield of kerosene and gas oil contradict each other, for high activity in desulfurization and the like there are used catalysts which comprise mainly amorphous inorganic oxides in the catalyst carriers, sacrificing the yield of kerosene-gas oil fraction, while when aiming at a high yield of kerosene-gas oil fraction there are used catalysts of high content zeolite carriers, leading to some decreases in activity of desulfurization and the like.

BRIEF SUMMARY OF THE INVENTION

The inventors of this application have devoted themselves to studies in order to ameliorate the disadvantage of the conventional catalysts which are unable to solve the contradictive relationship between the improvement in activity of desulfurization and the like and the increase in yield of kerosene-gas oil fraction and they have found that a catalyst, prepared by impregnating a hydrogenation metal on a carrier comprising an amorphous inorganic oxide and zeolite, when sulfate anions are intentionally added thereto, exhibits a conspicuously superior cracking activity as compared with a catalyst of the same kind which does not substantially contain sulfate anions.

In more detail of this point, generally speaking, it is not seldom in manufacturing catalysts that sulfate anions are mixed in the product from the materials used for catalyst carriers or from metal compounds used as precursors of active metal species. Said sulfate anions are generally regarded as catalyst poison.

Accordingly, when intending to manufacture highly active catalysts, it is customary that washing is effected sufficiently during their manufacturing processes or calcining is effected at temperatures which are capable of removing the mixed sulfate anions. The conventional hydrotreating catalysts are not exceptional.

The present invention, in contrast to the above mentioned usual discussion, intends to intentionally impregnate 1-15 wt %, preferably 3-10 wt % of sulfate anions in a hydrotreating catalyst in order to improve the cracking activity of said catalyst which takes part in the yield of kerosene-gas oil fraction as well as the activity thereof which takes part in desulfurization and the like.

The catalyst according to the present invention, in comparison with the usual hydrotreating catalyst which contains substantially no sulfate anions, can maintain the activity which takes part in desulfurization and the like at the same degree as the usual catalyst even when increasing the ratio of zeolite to the amorphous inorganic oxide in the catalyst carrier, and therefore the present invention can improve the yield of kerosene-gas oil fraction by the increased amount of zeolite, and when amorphous inorganic oxide is increased in contrast with this, the present invention can increase the activity of desulfurization and the like while maintaining the yield of kerosene-gas oil fraction at substantially the same degree as the usual catalysts.

DETAILED DESCRIPTION OF THE INVENTION

The catalyst according to the present invention can be prepared by using the same materials as those used in the preparation of usual hydrotreating catalysts. In this connection, it is to be noted that the usual hydrotreating catalyst uses, as its carrier, a mixture of an amorphous inorganic oxide such as alumina, silica-alumina, silica-magnesia or the like with zeolite, but this mixture can be used also in the present invention. However, it is preferable to use alumina as an amorphous inorganic oxide. To the mixture containing zeolite in an amount of 10-80 wt %, preferably 30-70 wt %, there is mixed an aqueous sulfuric acid solution or an aqueous sulfate solution such as ammonium sulfate or the like. It is to be noted that it is applicable in this case to add the aqueous sulfuric acid solution or the aqueous sulfate solution to the zeolite before being mixed with the amorphous inorganic oxide and then mix it with the latter. The amount of the aqueous sulfuric acid solution or aqueous sulfate solution added is selected from the range wherein the sulfate anions contained in the final catalyst composition may be 1-15 wt %, preferably 3-10 wt %, because in case the content of sulfate anions is less than 1 wt %, the effect of added sulfate anions can not be displayed, and in case it is more than 15 wt % the physical properties of the catalyst deteriorate, for instance the volume occupied by pores decreases. The catalyst carrier of the present invention preferably is prepared through the successive steps of making a mixture of alumina hydrate (amorphous inorganic oxide), zeolite and a sulfuric acid radical-containing solution, kneading said mixture in a kneader to the full, thereafter compression molding it and drying and calcining it. This catalyst carrier is impregnated with a hydrogenation metal. As said hydrogenation metal there are used, like the usual hydrotreating catalysts, one kind or more metals of Group VIA and Group VIII of the periodic table, and preferably the concurrent use of Group VIA metal and Group VIII metal. With reference to the amounts of metals carried, in the case of the metal of Group VIA said amount is in the range of about 5–24 wt % of the final catalyst composition and in the case of the metal of Group VIII said amount is likewise in the range of about 0.5–8 wt %.

The catalyst of the present invention are particularly suitable for hydrotreating heavy oils, typically topped crude and vacuum residue are cited, but may also be used for hydrotreating the vacuum gas oil, visbreaking oil, tar sand oil and the like. In the case of hydrotreating heavy oils by means of the catalysts of the present invention, it is made possible to select the reaction conditions optionally from the wide range covering severe and mild hydrotreating reaction conditions. In the concrete, the reaction conditions employable in the present invention are as follows: reaction temerature 300°–500° C., reaction pressure 40–300 kg/cm$^2$, hydrogen/oil ratio 200–3,000 Nm$^3$/Kl, LHSV 0.1–10.0 hr$^{-1}$ and hydrogen concentration 70 vol % or more.

Furthermore, concrete explanation will be made on the composition, and functional effect of the present invention.

EXAMPLE 1

An aqueous aluminum sulfate solution having a concentration of 2.5 wt % as Al$_2$O$_3$ was added to 80 kg of sodium aluminate solution having a concentration of 5.0 wt % as Al$_2$O$_3$ to thereby obtain 165 kg of alumina slurry having the pH 7.0. This alumina slurry was filtered and dewatered, and then was washed with 450 l of 0.2 wt % ammonia water to remove a by-product salt to thereby obtain an alumina hydrate (X). This hydrate was observed to have an Al$_2$O$_3$ concentration of 14.2 wt % and to contain 0.07 wt % of SO$_4{}^{2-}$.

On the other hand, a Y-zeolite, whose unit cell size 24.68 Å, SiO$_2$/Al$_2$O$_3$ molar ratio 5.0, and alkali metal content as Na$_2$O 13.0 wt %, was treated in a well known ammonium ion-exchange operation, and an ammonium ion-exchange Y-zeolite was obtained whose alkali metal content as Na$_2$O was 0.4 wt %. 1 kg of this zeolite was placed in a heating vessel, and was heated at 540° C. for 3 hours while introducing 300 ml/hr of water from the bottom of the vessel. Then, same was cooled to room temperature, treated with 4.8 l of 2N nitric acid, washed with water and subsequently dried at 120° C. for 24 hours, thereby obtaining a Y-zeolite (Z) whose unit cell size and SiO$_2$/Al$_2$O$_3$ molar ratio were 24.37 Å and 10.5 respectively.

Next, 4.79 kg of the above mentioned alumina hydrate (X), 1.0 kg of the Y-zeolite (Z) and 420 g of the 20 wt % aqueous ammonium sulfate solution were mixed together, this mixture was kneaded in a kneader while heating and concentrating, and thus pellet was obtained having a diameter of 1 mm each in a usual manner.

This pellet was dried at 110° C. for 16 hours, and then was calcined at 550° C. for 3 hours to thereby obtain a carrier.

660 g of this carrier was added with 396 ml of aqueous solution containing 161 g of metatungstic acid and 132 g of nickel nitrate for impregnation, was dried at 250° C. for 2 hours, and further was calcined at 550° C. for 1 hour to thereby obtain a catalyst (A). The amounts of tungsten and nickel carried on this catalyst were 13.5 wt % and 3.1 wt % as metal respectively. And, the SO$_4{}^{2-}$ content was 3.9 wt %.

EXAMPLE 2

1.0 kg of Y-zeolite (Z), 4.79 kg of alumina hydrate (X), each being obtained through the same procedure as Example 1, and further 840 g of 20 wt % aqueous ammonium sulfate solution, were mixed together, same was kneaded in a kneader while heating and concentrating, and then a carrier was prepared through the same procedure as Example 1. This carrier was treated according to the same procedure as Example 1 to thereby obtain a catalyst (B). The amounts of tungsten and nickel carried on this catalyst were 13.4 wt % and 3.1 wt % as metal respectively. And, the SO$_4{}^{2-}$ content was 7.8 wt %.

COMPARATIVE EXAMPLE 1

1.0 kg of Y-zeolite (Z) and 4.79 kg of alumina hydrate (X), each being obtained through the same procedure as Example 1, were mixed together. This mixture was added with water without adding thereto said aqueous ammonium sulfate solution, fed to a kneader and kneaded there while heating and concentrating. Next, this kneaded matter was molded into pellets having a diameter of 1 mm. This pellet was dried at 110° C. for 16 hours, and calcined at 550° C. for 3 hours, thereby obtaining a carrier which is substantially free from sulfate anions.

This carrier was impregnated with metatungstic acid and nickel nitrate, dried and calcined according to the same procedure as Example 1, thereby obtaining a catalyst (C). The amounts of tungsten and nickel supported on this catalyst were 13.4 wt % and 3.2 wt % as metal respectively. And, the SO$_4{}^{2-}$ content was 0.2 wt %.

CATALYST USE EXAMPLE

In order to compare the performance of each catalyst obtained by the above mentioned Examples and Comparative Examples, the undermentioned feed stock was hydrotreated under the following conditions. A reactor having the length of 3 m and the inside diameter of 19 mm, and charged with 300 cc of catalyst was used.

| Properties of feed oil | |
|---|---|
| Specific gravity (15/4° C.) | 0.976 |
| 343° C.$^+$ (vol %) | 98.3 |
| Viscosity (cst. at 50° C.) | 885 |
| Sulfur (wt %) | 4.04 |
| Nitrogen (ppm) | 2190 |
| Vanadium (ppm) | 58.7 |
| Nickel (ppm) | 15.9 |
| Reaction conditions | |
| Reaction pressure (kg/cm$^2$) | 135 |
| Reaction temperature (°C.) | 400 |
| LHSV (hr$^{-1}$) | 0.3 |
| H$_2$/oil (Nm$^3$/kl) | 600 |

The results after 200 hours since the start of reaction are as shown in the following table.

| Catalyst ($SO_4^{2-}$ content) | Catalyst (A) (3.9 wt %) | Catalyst (B) (7.8 wt %) | Catalyst (C) (0.2 wt %) |
|---|---|---|---|
| $C_4^-$ (wt %) | 2.0 | 3.0 | 1.5 |
| 171–343° C. yield (vol %) | 30 | 35 | 25 |
| 343° C.$^-$ conversion (wt %) | 44 | 52 | 30 |
| Denitrification (%) | 61 | 63 | 58 |
| Desulfurization (%) | 93 | 94 | 92 |
| Demetallization (%) | 77 | 80 | 74 |
| Product oil specific gravity (1514° C.) | 0.888 | 0.882 | 0.899 |

It is apparent from the above table that the use of catalysts (A) and (B), which have been intentionally incorporated with sulfate anions, the conversion up to 343° C.$^-$ fraction and the yield of the 171°–343° C. fraction which corresponds to the kerosene and gas oil increased as compared with the use of the substantially sulfate anion-free catalyst (C). In addition thereto, catalyst (A) and (B) display good results in denitrification, desulfurization and demetallization which are better than those of catalyst (C). Considering that the active metal species of the catalysts (A)–(C) are the same and the amounts of said species carried thereon are also substantially the same, it can be understood from the above results that the intentionally added sulfate anions in hydrotreating catalysts is extremely effective in order to enhance the yield of kerosene and gas oil and further improve the performance of desulfurization, denitrification and demetallization respectively.

We claim:

1. A catalyst for hydrotreating heavy oils, which comprises:

a hydrogenation, metal catalyst deposited on a catalyst carrier, said catalyst carrier comprising a mixture of zeolite and an amorphous inorganic oxide, said catalyst containing incorporated therein from 1 to 15 wt. % of sulfate anions ($SO_4^=$).

2. A catalyst according to claim 1 wherein said catalyst carrier contains 10–80 wt % of zeolite.

3. A catalyst as claimed in claim 1 which has been prepared by mixing together said zeolite, said amorphous inorganic oxide and a source of said sulfate anions, then molding, drying and calcining said mixture to obtain said catalyst carrier, and then depositing said hydrogenation, metal catalyst on said catalyst carrier.

4. A catalyst for hydrotreating heavy oils, which comprises:

a hydrogenation, metal catalyst deposited on a catalyst carrier, said hydrogenation, metal catalyst comprising a first metal selected from the group consisting of nickel, cobalt, and mixture thereof, and a second metal selected from the group consisting of molybdenum, tungsten and mixture thereof, said catalyst carrier comprising a mixture of Y-faujasite, alumina and sulfate anions ($SO_4^=$), said catalyst containing incorporated therein from 1 to 15 wt. % of said sulfate anions.

5. A catalyst as claimed in claim 4 which has been prepared by mixing together said Y-faujasite, said alumina and a source of said sulfate anions, then molding, drying and calcining said mixture to obtain said catalyst carrier, and then depositing said hydrogenation, metal catalyst on said catalyst carrier.

6. A catalyst as claimed in claim 5 which contains from 10 to 80 wt. % of said Y-faujasite.

7. A catalyst as claimed in claim 5 which contains from 30 to 70 wt. % of said Y-faujasite.

8. A catalyst as claimed in claim 5 which contains from 3 to 10 wt. % of said sulfate anions.

9. A catalyst as claimed in claim 5 which contains from 0.5 to 8 wt. % of said second metal and from 5 to 24 wt. % of said first metal.

* * * * *